(12) United States Patent
Yasui

(10) Patent No.: US 12,304,465 B2
(45) Date of Patent: May 20, 2025

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 17/953,428

(22) Filed: Sep. 27, 2022

(65) Prior Publication Data

US 2023/0097675 A1  Mar. 30, 2023

(30) Foreign Application Priority Data

Sep. 30, 2021  (JP) .................................. 2021-161668

(51) Int. Cl.
*B60W 30/09*  (2012.01)
*B60W 10/20*  (2006.01)
(Continued)

(52) U.S. Cl.
CPC ............ *B60W 30/09* (2013.01); *B60W 10/20* (2013.01); *B60W 30/0956* (2013.01);
(Continued)

(58) Field of Classification Search
None
See application file for complete search history.

(56) References Cited

U.S. PATENT DOCUMENTS 6,360,153 B1 * 3/2002 Shinmura .............. B60K 17/16
180/233
10,661,794 B2 * 5/2020 Niino ................. B60W 30/0953
(Continued)

FOREIGN PATENT DOCUMENTS

JP     2017-081482     5/2017
JP     2017-125959     7/2017
(Continued)

OTHER PUBLICATIONS

Japanese Office Action for Japanese Patent Application No. 2021-161668 mailed Sep. 3, 2024.

*Primary Examiner* — Redhwan K Mawari
*Assistant Examiner* — Kai Nmn Wang
(74) *Attorney, Agent, or Firm* — Amin, Turocy & Watson, LLP

(57) ABSTRACT

A driving assistance device includes a storage device configured to store a program and a processor connected to the storage device. The processor executes the program to recognize a physical object, generate a future avoidance trajectory along which a moving object is able to move while avoiding the contact with the physical object, acquire a steering state of the moving object, determine an amount of change in an avoidance trajectory error, calculate an index value by making a weight of an avoidance trajectory error at a point in time earlier than a reference point in time greater or less than a weight of the avoidance trajectory error at the reference point in time according to the amount of change, and guide a driver of the moving object or the moving object such that the steering state of the moving object is changed in accordance with the index value.

11 Claims, 7 Drawing Sheets

(51) Int. Cl.
  *B60W 30/095* (2012.01)
  *B60W 40/04* (2006.01)
  *B60W 50/00* (2006.01)
  *B60W 50/14* (2020.01)

(52) U.S. Cl.
  CPC ........ *B60W 40/04* (2013.01); *B60W 50/0097* (2013.01); *B60W 50/14* (2013.01); *B60W 2050/143* (2013.01); *B60W 2050/146* (2013.01); *B60W 2540/18* (2013.01); *B60W 2554/4041* (2020.02); *B60W 2554/4045* (2020.02); *B60W 2554/801* (2020.02); *B60W 2710/202* (2013.01)

(56) References Cited

U.S. PATENT DOCUMENTS

| | | | | |
|---|---|---|---|---|
| 11,001,258 | B2* | 5/2021 | Kim | G06V 20/588 |
| 11,097,724 | B2* | 8/2021 | Maeda | G08G 1/163 |
| 2017/0008518 | A1* | 1/2017 | Arndt | B60W 30/09 |
| 2017/0205741 | A1 | 7/2017 | Watanabe | |
| 2017/0327111 | A1* | 11/2017 | Bonarens | B60W 10/18 |
| 2018/0178802 | A1* | 6/2018 | Miyata | B60W 30/095 |
| 2018/0273026 | A1* | 9/2018 | Oyama | B60W 30/18145 |
| 2018/0297594 | A1 | 10/2018 | Takahashi et al. | |
| 2019/0039610 | A1* | 2/2019 | Mukai | B60W 30/095 |
| 2020/0361491 | A1* | 11/2020 | Kitaura | B60W 60/0017 |
| 2021/0179094 | A1* | 6/2021 | Newman | G05D 1/617 |
| 2022/0111838 | A1* | 4/2022 | Cho | B60W 10/18 |
| 2022/0234654 | A1* | 7/2022 | Kakeshita | B62D 6/002 |

FOREIGN PATENT DOCUMENTS

| | | |
|---|---|---|
| JP | 2018-161996 | 10/2018 |
| JP | 2021-095021 | 6/2021 |
| JP | 2021095021 A * | 6/2021 |

* cited by examiner

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2021-161668, filed Sep. 30, 2021, the content of which is incorporated herein by reference.

BACKGROUND

Field of the Invention

The present invention relates to a driving assistance device, a driving assistance method, and a storage medium.

Description of Related Art

In the related art, an invention of a device for detecting an obstacle located in front of a host vehicle and automatically steering a steering wheel to avoid a collision with the obstacle (Japanese Unexamined Patent Application, First Publication No. 2021-95021) has been disclosed.

SUMMARY

In the related art, it may be difficult to appropriately improve responsiveness in situations where it is necessary.

The present invention has been made in consideration of the above circumstances and an objective of the present invention is to provide a driving assistance device, a driving assistance method, and a storage medium capable of appropriately improving responsiveness in situations where it is necessary.

A driving assistance device, a driving assistance method, and a storage medium according to the present invention adopt the following configurations.

(1): According to an aspect of the present invention, there is provided a driving assistance device including: a storage device configured to store a program; and a processor connected to the storage device, wherein the processor executes the program stored in the storage device to: recognize a physical object with which the moving object should avoid contact, generate a future avoidance trajectory along which the moving object is able to move while avoiding the contact with the physical object, acquire a steering state of the moving object and determine whether or not an amount of change in an avoidance trajectory error indicating an amount of deviation between the steering state and the avoidance trajectory exceeds a first threshold value that is a positive value or is less than a second threshold value that is a negative value at a reference point in time and a point in time earlier than the reference point in time, calculate an index value by making a weight of the avoidance trajectory error at the point in time earlier than the reference point in time greater than a weight of the avoidance trajectory error at the reference point in time when the amount of change in the avoidance trajectory error does not exceed the first threshold value or is greater than or equal to the second threshold value, calculate the index value by making the weight of the avoidance trajectory error at the reference point in time greater than the weight of the avoidance trajectory error at the point in time earlier than the reference point in time when the amount of change in the avoidance trajectory error exceeds the first threshold value or is less than the second threshold value, and guide a driver of the moving object or the moving object such that the steering state of the moving object is changed in accordance with the index value.

(2): In the above-described aspect (1), the processor determines whether or not the amount of change exceeds the first threshold value that is the positive value or is less than the second threshold value that is the negative value with respect to each of a plurality of periods from a plurality of previous points in time to the reference point in time, and the processor calculates the index value by obtaining statistical values of the avoidance trajectory error at the plurality of points in time and calculates the index value by replacing the avoidance trajectory error at a corresponding point in time with the avoidance trajectory error at the reference point in time with respect to points in time corresponding to a period in which the amount of change exceeds the first threshold value or is less than the second threshold value at the time of the calculation of the index value.

(3): In the above-described aspect (1), the processor calculates the amount of change in the avoidance trajectory error on the basis of the avoidance trajectory error at the reference point in time and a past value of the index value and calculates the index value on the basis of the amount of change in the past value of the index value and the avoidance trajectory error at the reference point in time and calculates the index value by increasing the weight of the avoidance trajectory error at the reference point in time for the past value of the index value when the amount of change in the avoidance trajectory error exceeds the first threshold value or is less than the second threshold value at the time of the calculation of the index value.

(4): In the above-described aspect (1), the avoidance trajectory error is a difference between a steering angle of the moving object and a target steering angle for the moving object to move along the avoidance trajectory.

(5): In the above-described aspect (1), the avoidance trajectory error is a value indicating a degree of deviation in a lateral direction between a trajectory through which the moving object is predicted to pass and the avoidance trajectory on an assumption that the steering state of the moving object continues.

(6): In the above-described aspect (5), on the assumption that the steering state of the moving object continues, the value indicating the degree of deviation is a sum of amounts of deviation associated with differences between two or more lateral positions through which the moving object is predicted to pass (or positions related to a movement path in a width direction) corresponding to two or more longitudinal positions related to the movement path in a longitudinal direction and two or more lateral positions on the avoidance trajectory corresponding to the two or more longitudinal positions (7): In the above-described aspect (1), the processor guides the driver of the moving object such that the steering state of the moving object is changed by causing a speaker to output a sound for prompting the driver to change the steering state and/or causing a display device to display an image for prompting the driver to change the steering state.

(8): In the above-described aspect (1), the processor guides the driver of the moving object or the moving object such that the steering state of the moving object is changed by causing a reaction force, which prevents an operation in a direction identical to that of a current steering state, to be output to an actuator attached to a steering operation element that receives a steering operation of the driver.

(9): In the above-described aspect (1), the processor guides the driver of the moving object or the moving object such that the steering state of the moving object is changed by increasing a steering force in a direction opposite to that of a current steering state with respect to a steering device.

(10): According to another aspect of the present invention, there is provided a driving assistance method using a driving assistance device, the method including: acquiring a steering state of a moving object; recognizing a physical object located at least at a traveling direction side of the moving object and with which the moving object should avoid contact; determining whether or not an amount of change in an avoidance trajectory error indicating an amount of deviation between the steering state and the avoidance trajectory exceeds a first threshold value that is a positive value or is less than a second threshold value that is a negative value at a reference point in time and a point in time earlier than the reference point in time; calculating an index value by making a weight of the avoidance trajectory error at the point in time earlier than the reference point in time greater than a weight of the avoidance trajectory error at the reference point in time when the amount of change in the avoidance trajectory error does not exceed the first threshold value or is greater than or equal to the second threshold value; calculating the index value by making the weight of the avoidance trajectory error at the reference point in time greater than the weight of the avoidance trajectory error at the point in time earlier than the reference point in time when the amount of change in the avoidance trajectory error exceeds the first threshold value or is less than the second threshold value; and guiding a driver of the moving object or the moving object such that the steering state of the moving object is changed in accordance with the index value.

(11): According to yet another aspect of the present invention, there is provided a computer-readable non-transitory storage medium storing a program causing a processor of a driving assistance device to: acquire a steering state of a moving object, recognize a physical object located at least at a traveling direction side of the moving object and with which the moving object should avoid contact, determine whether or not an amount of change in an avoidance trajectory error indicating an amount of deviation between the steering state and the avoidance trajectory exceeds a first threshold value that is a positive value or is less than a second threshold value that is a negative value at a reference point in time and a point in time earlier than the reference point in time, calculate an index value by making a weight of the avoidance trajectory error at the point in time earlier than the reference point in time greater a weight of the avoidance trajectory error at the reference point in time when the amount of change in the avoidance trajectory error does not exceed the first threshold value or is greater than or equal to the second threshold value, calculate the index value by making the weight of the avoidance trajectory error at the reference point in time greater than the weight of the avoidance trajectory error at the point in time earlier than the reference point in time when the amount of change in the avoidance trajectory error exceeds the first threshold value or is less than the second threshold value, and guide a driver of the moving object or the moving object such that the steering state of the moving object is changed in accordance with the index value.

According to the aspects (1) to (11), it is possible to appropriately improve responsiveness in situations where it is necessary.

DESCRIPTION OF EMBODIMENTS

Hereinafter, embodiments of a driving assistance device, a driving assistance method, and a storage medium according to the present invention will be described with reference to the drawings. A driving assistance device is a device that supports driving of a moving object. "Moving object" refers to a structure that can be moved by its own drive mechanism, such as a vehicle, micro-mobility, an autonomous moving robot, a ship, or a drone. In the following description, it is assumed that the moving object is a vehicle that moves on the ground and only the configuration and functions for moving the vehicle on the ground will be described. "Supporting driving" indicates giving advice on a driving operation by voice, display, or the like or performing interference control to some extent, for example, in primarily manual driving. Also, supporting driving may include autonomously moving the moving object at least temporarily.

First Embodiment

Figure 1:
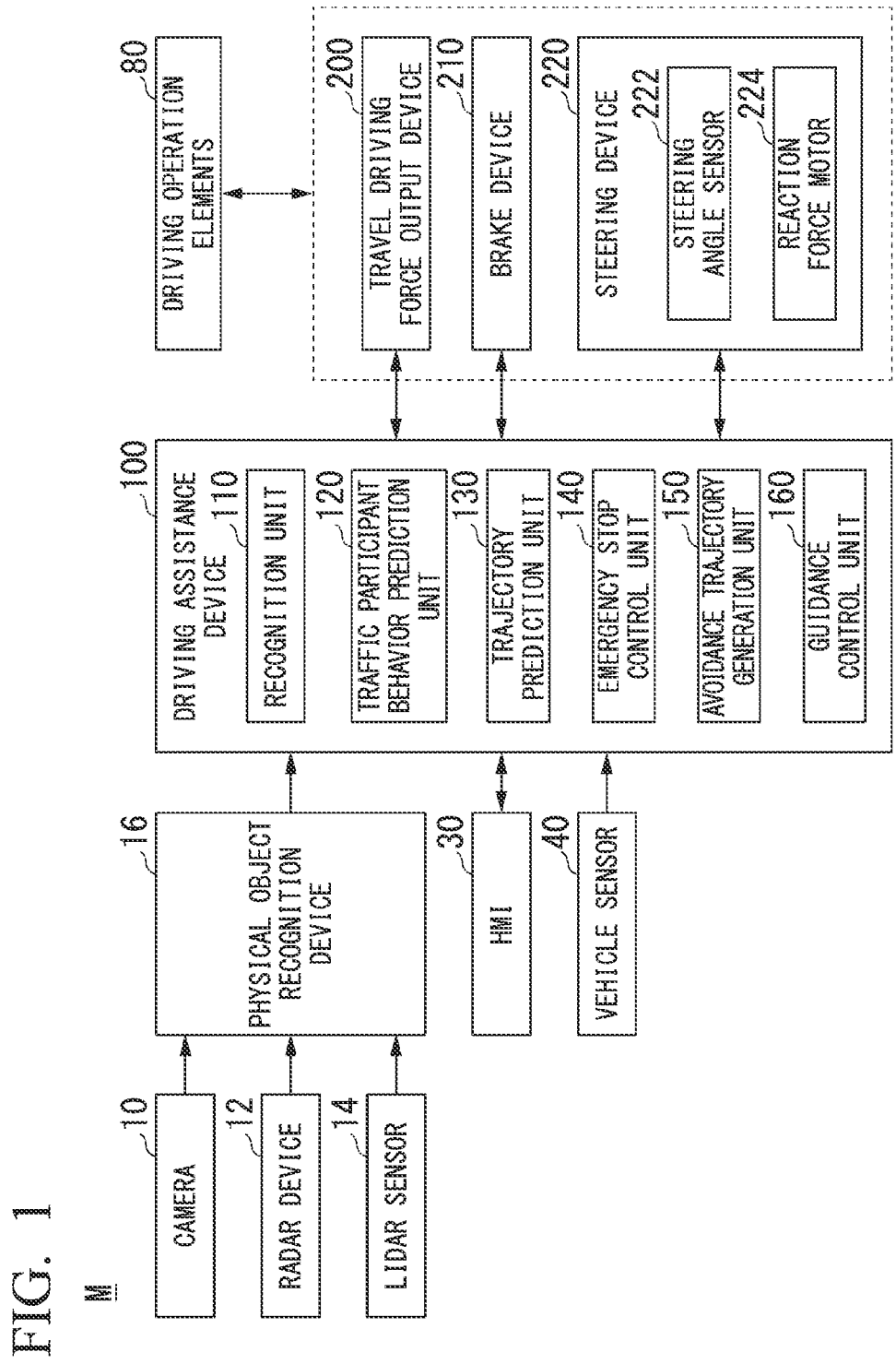
FIG. 1 is a configuration diagram focusing on a driving assistance device according to a first embodiment.

FIG. 1 is a configuration diagram focusing on a driving assistance device 100 according to a first embodiment. The driving assistance device 100 is mounted in a vehicle. In addition to the driving assistance device 100, this vehicle (hereinafter referred to as a host vehicle M) is equipped with, for example, a configuration of a camera 10, a radar device 12, a light detection and ranging (LIDAR) sensor 14, a physical object recognition device 16, a human machine interface (HMI) 30, a vehicle sensor 40, driving operation elements 80, a travel driving force output device 200, a brake device 210, a steering device 220, and the like. The configuration shown in FIG. 1 is merely an example and some of the components may be omitted or other components may be further added.

For example, the camera 10 is a digital camera using a solid-state imaging element such as a charge-coupled device (CCD) or a complementary metal-oxide semiconductor (CMOS). The camera 10 is attached to any location on the vehicle (hereinafter referred to as the host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and a speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process for detection results from some or all of the camera 10, the radar device 12, and the LIDAR sensor 14 to recognize a position, a type, a speed, and the like of a physical object. The physical object recognition device 16 outputs recognition results to the driving assistance device 100. The physical object recognition device 16 may output detection results of the camera 10, the radar device 12, and the LIDAR sensor 14 to the driving assistance device 100 as they are. The physical object recognition device 16 may be omitted from the vehicle system 1.

The HMI 30 presents various types of information to an occupant of the host vehicle M and receives an input operation by the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect angular velocity around a vertical axis, a direction sensor configured to detect a direction of the host vehicle M, and the like.

For example, the driving operation elements 80 include an accelerator pedal, a brake pedal, a shift lever, a steering wheel, a variant steering wheel, a joystick, and other operation elements. A sensor configured to detect an amount of operation or the presence or absence of an operation is attached to the driving operation element 80 and a detection result thereof is output to the driving assistance device 100 or some or all of the travel driving force output device 200, the brake device 210, and the steering device 220.

Before the description of the driving assistance device 100, the travel driving force output device 200, the brake device 210, and the steering device 220 will be described.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the driving assistance device 100 or the information input from the driving operation element 80 such that brake torque according to a braking operation is output to each wheel. The brake device 210 may include a mechanism configured to transfer the hydraulic pressure generated by an operation of the brake pedal included in the driving operation elements 80 to the cylinder via a master cylinder as a backup. Also, the brake device 210 is not limited to the above-described configuration and may be an electronically controlled hydraulic brake device configured to transfer the hydraulic pressure of the master cylinder to the cylinder.

For example, the steering device 220 includes a steering ECU, an electric motor, a steering angle sensor 222, and a reaction force motor 224. For example, the electric motor changes a direction of steerable wheels by applying a force to a rack and pinion mechanism. The steering ECU drives the electric motor in accordance with the information input from the driving operation element 80 to change the direction of the steerable wheels. The steering angle sensor 222 detects a state (for example, an operation angle) of a steering operation element such as a steering wheel and outputs the detected state to the steering ECU and the driving assistance device 100. The reaction force motor 224 outputs a force (a reaction force) to the steering wheel in a direction in which the operation of the occupant is hindered in accordance with an instruction input from the driving assistance device 100 or the like.

The driving assistance device 100 includes, for example, a recognition unit 110, a traffic participant behavior prediction unit 120, a trajectory prediction unit 130, an emergency stop control unit 140, an avoidance trajectory generation unit 150, and a guidance control unit 160. These components are implemented, for example, by a hardware processor such as a central processing unit (CPU) executing a program (software). Some or all of these components may be implemented by hardware (including a circuit unit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the driving assistance device 100 or may be stored in a removable storage medium such as a DVD or a CD-ROM and installed in the HDD or the flash memory of the driving assistance device 100 when the storage medium (the non-transitory storage medium) is mounted in a drive device.

The recognition unit 110 recognizes states of a type, a position, a speed, acceleration, and the like of a physical object near the host vehicle M on the basis of information input from the camera 10, the radar device 12, the LIDAR sensor 14, and the like via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended). In this way, the recognition unit 110 recognizes a physical object located at least at a traveling direction side of the host vehicle M and required to avoid contact with the host vehicle M.

Also, for example, the recognition unit 110 recognizes a lane (a traveling lane) in which the host vehicle M is traveling. For example, the recognition unit 110 recognizes a position or orientation of the host vehicle M with respect to the traveling lane. For example, the recognition unit 110 may recognize a gap of a reference point of the host vehicle M from the center of the lane and an angle formed with respect to a line connected to the center of the lane in the traveling direction of the host vehicle M as a relative position and orientation of the host vehicle M related to the traveling lane. Alternatively, the recognition unit 110 may recognize a position of the reference point of the host vehicle M related to one side end portion (a road marking or a road boundary) of the traveling lane or the like as a relative position of the host vehicle M related to the traveling lane.

The traffic participant behavior prediction unit 120 predicts future behavior of an entity (a traffic participant) among physical objects recognized by the recognition unit 110 located in a traveling lane or in an adjacent lane adjacent to the traveling lane and moving on its own. Traffic participants include other vehicles, pedestrians, bicycles, and the like. For example, the traffic participant behavior prediction unit 120 may predict the future behavior of the traffic participant on the basis of a past movement history of the traffic participant on an assumption that the speed is uniform, the acceleration is uniform, or the like or may predict the future behavior of the traffic participant in methods using a Kalman filter or the like. Also, the future behavior of traffic participants may be predicted in consideration of directions of the traffic participants (a direction of a vehicle body axis in the case of a vehicle or a face direction in the case of a pedestrian). Future behavior indicates, for example, the position of the traffic participant at a plurality of points in time in the future.

Further, the traffic participant behavior prediction unit 120 may set a risk that is a reference value indicating a degree to which the host vehicle M should not enter or approach an assumed plane S represented as a two-dimensional plane when a space around the host vehicle M is viewed from above on the basis of the predicted future behavior of the traffic participant or the like. In other words, the risk indicates the existence probability of a target (including not only traffic participants but also non-traveling areas such as road shoulders, guardrails, and areas outside of the white line) (the risk may not be a "probability" in the strict sense). A larger value of the risk indicates that the host vehicle M should not enter or approach and a value of the risk closer to zero indicates that it is preferable for the host vehicle M to travel. However, this relationship may be reversed.

The traffic participant behavior prediction unit 120 also sets the risk on the assumed plane S for each future point defined at regular time intervals such as a current time t, after Δt (time t+Δt), after 2Δt (time t+2Δt), and the like.

Figure 2:
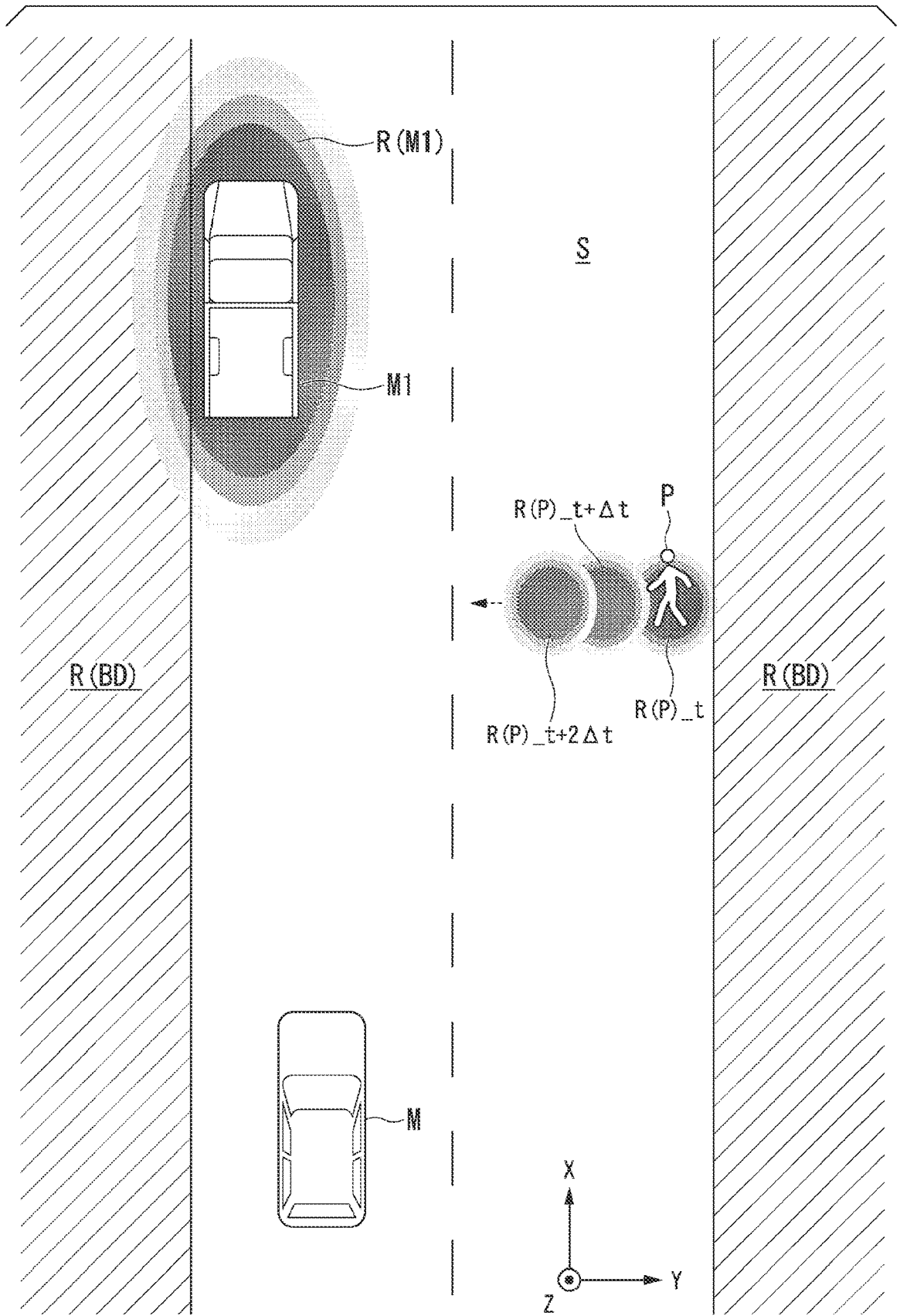
FIG. 2 is a diagram showing an overview of risks set by a traffic participant behavior prediction unit.

FIG. 2 is a diagram showing an overview of risks set by the traffic participant behavior prediction unit 120. The traffic participant behavior prediction unit 120 sets the risk using ellipses or circles based on a traveling direction and a speed as contour lines on the assumed plane S with respect to the traffic participant and sets the risk of a constant value for a region where traveling is impossible. In FIG. 2, R(M1) denotes a risk of a stopped vehicle M1 and R(P) denotes a risk of a pedestrian P. Because the pedestrian P is moving in a road crossing direction, the risk is set at a position different from that of the current time with respect to each future point in time. The same is true for moving vehicles, bicycles, and the like. R(BD) denotes a risk of a non-traveling area BD. In FIG. 2, a density of hatching indicates a risk value and the risk is higher when the hatching is darker. The traffic participant behavior prediction unit 120 may set the risk such that the value is larger when the vehicle is farther away from the center of the lane. Also, the traffic participant behavior prediction unit 120 may simply predict the positions of traffic participants at a plurality of points in the future without setting such risks.

The trajectory prediction unit 130 inputs a speed VM of the host vehicle M detected by the vehicle speed sensor included in the vehicle sensor 40 and a steering angle θM of the host vehicle M detected by the steering angle sensor 222 of the steering device 220 to a vehicle body model (an arc model, a two-wheel model, or the like) and predicts a trajectory of the host vehicle M for a certain period of time in the future. Because various methods are known in relation to the vehicle body model, detailed description thereof is omitted. Also, the trajectory prediction unit 130 may be omitted in the first embodiment.

The emergency stop control unit 140 instructs the brake device 210 to stop the host vehicle M when it is determined that the position of the physical object recognized by the recognition unit 110 is on a trajectory of the host vehicle M predicted by the trajectory prediction unit 130 (for example, the position of the physical object is replaced with a position of the physical object "within a region where a vehicle width of the host vehicle M extends in the traveling direction" when the trajectory prediction unit 130 is omitted) and contact avoidance through steering is difficult. For example, the emergency stop control unit 140 causes the host vehicle M to be stopped when the position of the physical object recognized by the recognition unit 110 is on the trajectory of the host vehicle M predicted by the trajectory prediction unit 130 and a time to collision (TTC) associated with the physical object is less than or equal to a threshold value. When the emergency stop control unit 140 causes the host vehicle M to be stopped by performing the above-described operation, the avoidance trajectory generation unit 150 and the guidance control unit 160 stop their operations.

The avoidance trajectory generation unit 150 generates a future avoidance trajectory along which the host vehicle M can move while avoiding contact with the physical object recognized by the recognition unit 110. For example, the avoidance trajectory generation unit 150 generates an avoidance trajectory such that the avoidance trajectory passes through points where the risk is as small as possible and an amount of turning at a plurality of points (trajectory points) on the avoidance trajectory becomes as small as possible.

Figure 3:
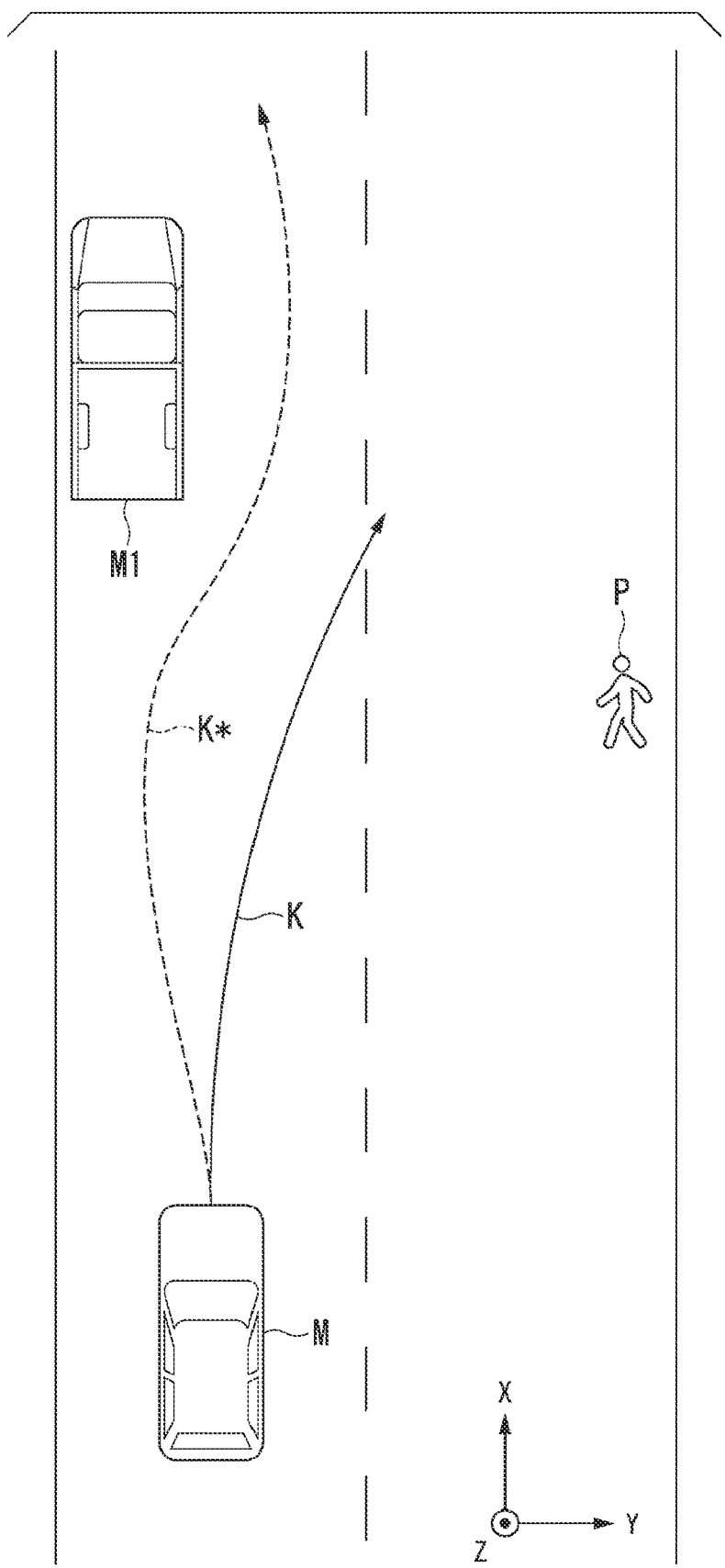
FIG. 3 is a diagram for describing a process of a guidance control unit.

FIG. 3 is a diagram for describing a process of the guidance control unit 160. In FIG. 3, K denotes a trajectory predicted by the trajectory prediction unit 130 and K* denotes an avoidance trajectory generated by the avoidance trajectory generation unit 150. As shown in FIG. 3, it is preferable to move along the avoidance trajectory K* such that the pedestrian P crossing from the right is avoided and the stopped vehicle M1 is circumvented, but movement is performed along the trajectory K when the steering angle θM of a current point in time is maintained.

In such a situation, the guidance control unit 160 provides guidance for the driver of the host vehicle M or the steering state of the host vehicle M such that the steering state is changed when the deviation between the avoidance trajectory K* and the steering state is large. In the first embodiment, the steering state is the steering angle θM. More specifically, the guidance control unit 160 acquires the steering angle θM of the host vehicle M and determines whether or not an amount of change in an avoidance trajectory error indicating an amount of deviation between the steering angle θM and the avoidance trajectory K* exceeds a first threshold value that is a positive value or is less than a second threshold value that is a negative value at a reference point in time and a point in time earlier than the reference point in time. The guidance control unit 160 calculates an index value by making a weight of the avoidance trajectory error at the point in time earlier than the reference point in time greater than a weight of the avoidance trajectory error at the reference point in time when the amount of change in the avoidance trajectory error does not exceed the first threshold value or is greater than or equal to the second threshold value. The guidance control unit 160 calculates the index value by making the weight of the avoidance trajectory error at the reference point in time greater than the weight of the avoidance trajectory error at the point in time earlier than the reference point in time when the amount of change in the avoidance trajectory error exceeds the first threshold value or is less than the second threshold value, and guides a driver such that the steering state of the host vehicle M is changed in accordance with the index value.

The absolute values of the first threshold value and the second threshold value may be the same value or different values. In the following description, first threshold value=absolute value of second threshold value=ε is assumed.

More specifically, the guidance control unit 160 according to the first and second embodiments determines whether or not the amount of change exceeds the first threshold value that is the positive value or is less than the second threshold value that is the negative value with respect to each of a plurality of periods from a plurality of previous points in time to the reference point in time. The guidance control unit 160 calculates the index value by obtaining statistical values of the avoidance trajectory error at the plurality of points in time and calculates the index value by replacing the avoidance trajectory error at a corresponding point in time with the avoidance trajectory error at the reference point in time with respect to points in time corresponding to a period in which the amount of change exceeds the first threshold value or is less than the second threshold value at the time of the calculation of the index value.

Hereinafter, an avoidance trajectory error representing the amount of deviation between the steering angle θM and the avoidance trajectory K* is denoted by Eθ(k). Hereinafter, a symbol in parentheses denotes a control time. Also, the "index value" described above is represented as a guidance parameter Plead(k).

The avoidance trajectory error Eθ(k) is, for example, a difference between the steering angle θM of the host vehicle M and the target steering angle θM* for moving along the avoidance trajectory K*. The target steering angle θM* is decided on the basis of, for example, an angle formed by a direction of the host vehicle M of a current point in time and a direction from the host vehicle M to a forward point at a predetermined distance on the avoidance trajectory K* and the speed VM of the host vehicle M. The avoidance trajectory error Eθ(k) is an avoidance trajectory error at control time k and the avoidance trajectory error Eθ(k−j) is an avoidance trajectory error at control time k−j.

The guidance control unit 160 calculates the guidance parameter Plead(k) on the basis of, for example, Eqs. (1) to (3). The guidance control unit 160 calculates Dθ(k−j) and Mθ(k−j) for each value of j=1 to m.

$$D\theta(k-j) = E\theta(k-j) - E\theta(k) \tag{1}$$

$$M\theta(k-j) = \begin{cases} E\theta(k) \, (D\theta(k-j) < -\varepsilon, \, D\theta(k-j) > \varepsilon) \\ E\theta(k-j) \, (-\varepsilon \le D\theta(k) \le \varepsilon) \end{cases} \tag{2}$$

$$\text{Plead}(k) = \frac{1}{m+1} \cdot \sum_{j=1}^{m} M\theta(k-j) \tag{3}$$

Dθ(k−j) in Eq. (1) is an amount of change in the avoidance trajectory error Eθ from a past point (k−j) in time to a reference point (k) in time. Mθ(k−j) (j=1 to m) in Eq. (2) is a calculation element for which a total value (a statistical value) is obtained in Plead(k) of Eq. (3). m denotes the number of filter taps. Each value of Mθ(k−j) becomes Eθ(k−j), i.e., an avoidance trajectory error at a past point in time, when Dθ(k−j) is greater than or equal to −ε and less than or equal to c and is replaced with Eθ(k), i.e., the avoidance trajectory error at the reference point (k) in time, when Dθ(k−j) is less than −ε or greater than ε. The guidance parameter Plead(k) is obtained by summing Mθ(k−j) for j=1 to m and further dividing a sum of Mθ(k−j) by (m+1).

As a result of such calculation, the guidance parameter Plead(k) is calculated by making a weight of the avoidance trajectory error at the point in time earlier than the reference point in time greater than a weight of the avoidance trajectory error at the reference point in time when the amount of change in the avoidance trajectory error indicating the amount of deviation between the steering angle θM and the avoidance trajectory K* does not exceed the first threshold value or is greater than or equal to the second threshold value and is calculated by making a weight of the avoidance trajectory error at the reference point in time greater than a weight of the avoidance trajectory error at the point in time earlier than the reference point in time when the amount of change in the avoidance trajectory error exceeds the first threshold value or is less than the second threshold value. Thereby, when the absolute value of the avoidance trajectory error Eθ suddenly increases at a certain point in time due to a sudden change in a surrounding situation of the host vehicle M due to other traffic participants jumping out, unexpected behavior, and the like, the guidance parameter Plead quickly follows the avoidance trajectory error Eθ smoothed by calculating the moving average.

Figure 4:
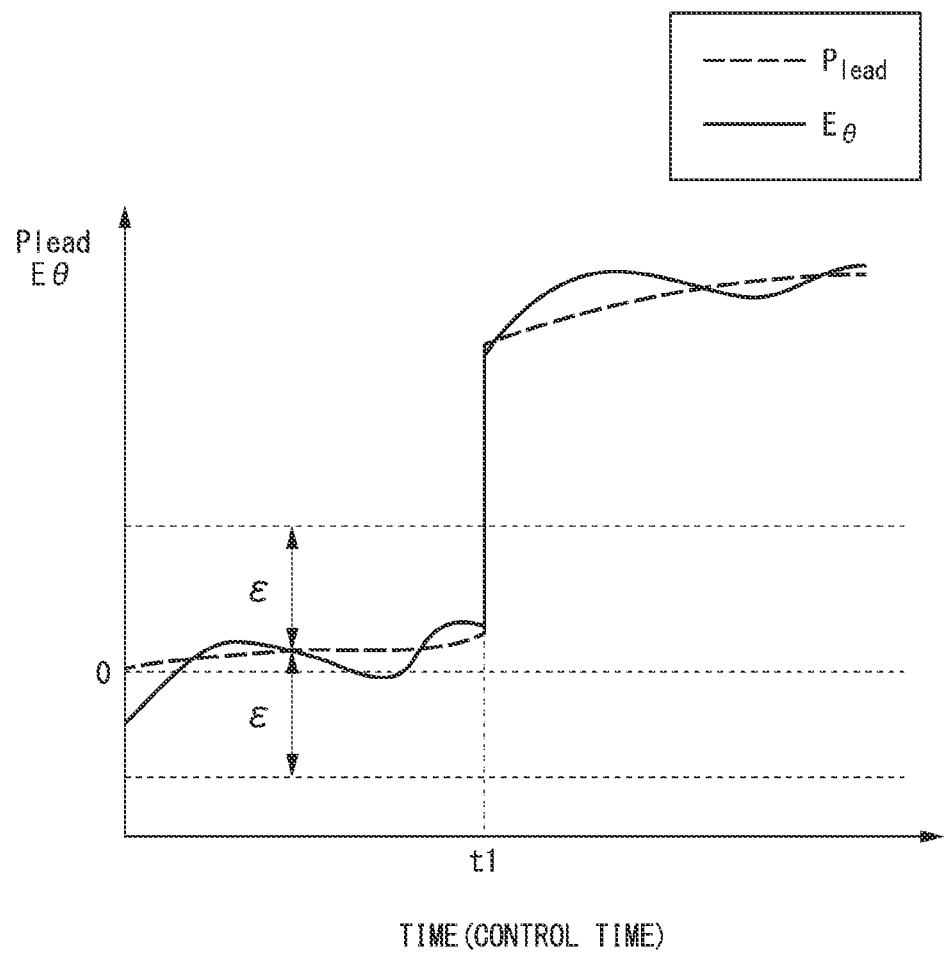
FIG. 4 is a graph showing an example of a change over time in an avoidance trajectory error and a guidance parameter.

FIG. 4 is a graph showing an example of changes over time in the avoidance trajectory error Eθ and the guidance parameter Plead. In FIG. 4, because the avoidance trajectory error Eθ is included within a range of ±ε around zero until time t1, the guidance parameter Plead is decided on the basis of a moving average value between the avoidance trajectory errors Eθ(k−1) to Eθ(k−m). When the avoidance trajectory error Eθ(k) suddenly changes from Eθ(k−1) at time t1 and Mθ(k−j) based on each of the avoidance trajectory errors Eθ(k−1) to Eθ(k−m) deviates from the range of ±ε around zero, the guidance parameter Plead is calculated primarily on the basis of the avoidance trajectory error Eθ(k). Because there is a high possibility that no particular traffic event will occur before the avoidance trajectory error $E\theta(k)$ suddenly changes, variations in values $E\theta(k-1)$ to $E\theta(k-m)$ are sufficiently small compared to an amount of change when $E\theta(k)$ changes suddenly due to a traffic event. Thus, when the avoidance trajectory error $E\theta(k)$ suddenly changes from $E\theta(k-1)$, there is a high possibility that amounts of change $D\theta(k-2)$ to $D\theta(k-m)$ as well as $D\theta(k-1)$ will also deviate from the range of $\pm\varepsilon$ around zero (in other words, c is defined in this way). As a result, when the surrounding situation of the host vehicle M suddenly changes due to other traffic participants jumping out, unexpected behavior, and the like, it is possible to quickly provide guidance corresponding to the change in the surrounding situation. Also, because the guidance parameter Plead is calculated on the basis of the moving average of the avoidance trajectory errors $E\theta(k-1)$ to $E\theta(k-m)$ when $E\theta(k)$ does not change suddenly from $E\theta(k)$, it is possible to limit a malfunction such as an erroneous operation, hunting, or excessive control.

The guidance control unit 160 guides the driver's steering operation by outputting guidance information about the steering direction to the driver of the host vehicle M using the HMI 30 in accordance with the guidance parameter Plead. For example, assuming that the steering angle $\theta M$ deviates toward the right with respect to the avoidance trajectory $K^*$ if the guidance parameter Plead is positive and the steering angle $\theta M$ deviates toward the left with respect to the avoidance trajectory $K^*$ if the guidance parameter Plead is negative, for example, the guidance control unit 160 causes the HMI 30 to output guidance information indicating "please turn the steering wheel to the left" when the guidance parameter Plead is large and "please turn the steering wheel to the right" when the guidance parameter Plead is small. The guidance control unit 160 may increase a degree of output of the guidance information as the absolute value of the guidance parameter Plead increases. "Increasing the degree of output" indicates, for example, increasing a volume, increasing a sound tone, increasing the contrast of display colors, increasing a display area, and the like. The guidance control unit 160 may cause the HMI 30 to output guidance information only when the absolute value of the guidance parameter Plead is greater than or equal to the threshold value.

Instead of or in addition to a process of causing the HMI 30 to output the guidance information as described above, for example, the guidance control unit 160 may instruct the steering device 220 to increase a reaction force for the steering operation in the right direction compared with a reaction force for the steering operation in the left direction when the guidance parameter Plead is large and increase the reaction force for the steering operation in the left direction compared with the reaction force for the steering operation in the right direction when the guidance parameter Plead is small.

Figure 5:
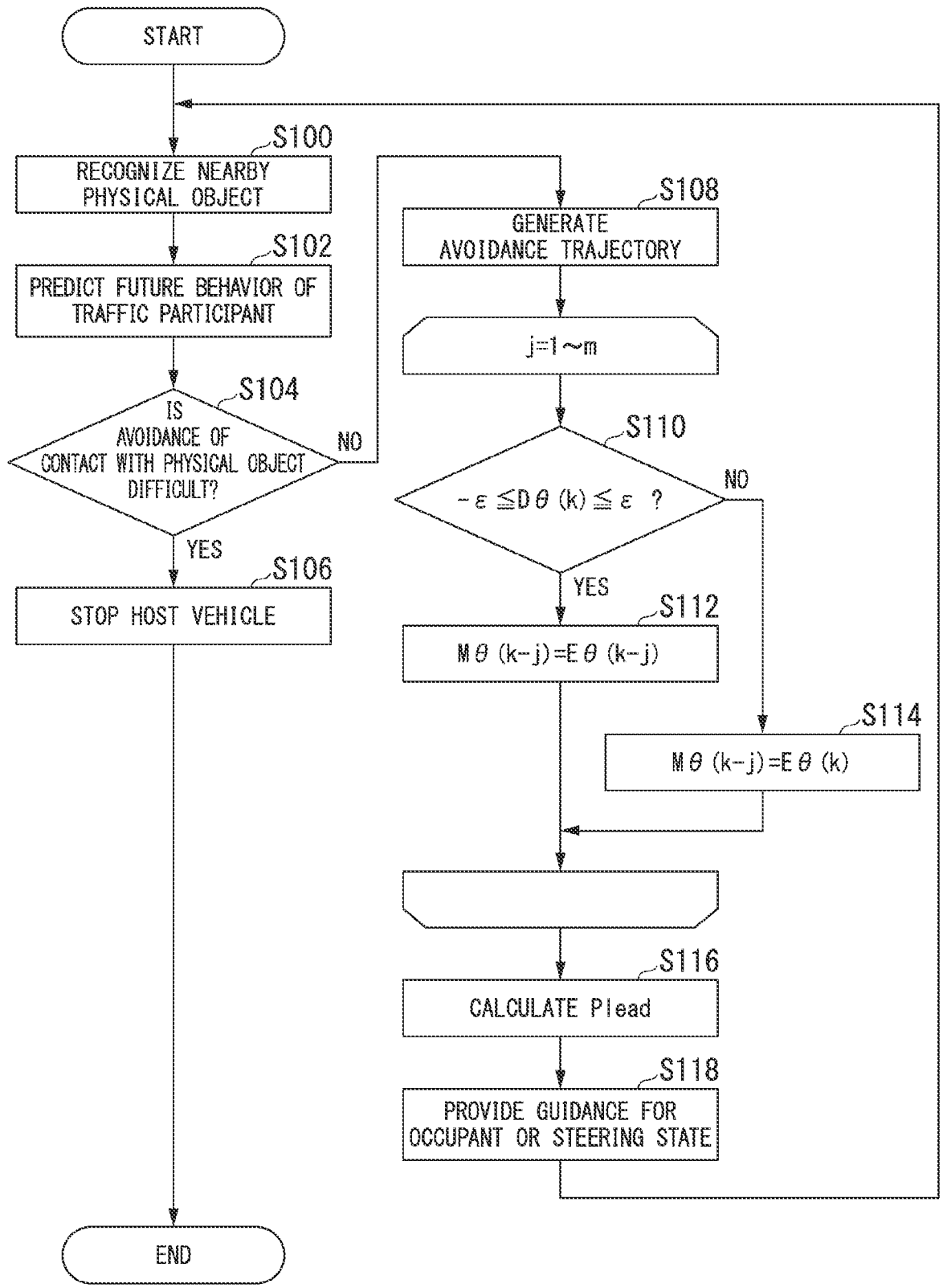
FIG. 5 is a flowchart showing an example of a flow of a process executed by the driving assistance device.

FIG. 5 is a flowchart showing an example of a flow of a process executed by the driving assistance device 100. First, the recognition unit 110 recognizes a physical object near the host vehicle M (step S100) and the traffic participant behavior prediction unit 120 predicts future behavior of the traffic participant (step S102).

Subsequently, the emergency stop control unit 140 determines whether it is difficult to avoid contact with the physical object recognized in step S100 (step S104). If it is determined that it is difficult to avoid the contact, the emergency stop control unit 140 instructs the brake device 210 to output a specified braking force and stop the host vehicle M (step S106).

When it is not determined that contact avoidance is difficult in step S120, the avoidance trajectory generation unit 150 generates an avoidance trajectory $K^*$ (step S108).

Next, the guidance control unit 160 determines whether or not an amount of change $D\theta(k-j)$ of the avoidance trajectory error $E\theta$ is included within the range of $\pm\varepsilon$ for each of the parameters j=1 to m (step S110), sets $M\theta(k-j)=E\theta(k-j)$ when the amount of change $D\theta(k)$ is included within the range of $\pm\varepsilon$ (step S112), and sets $M\theta(k-j)=E\theta(k)$ when the amount of change $D\theta(k)$ is not included within the range of $\pm\varepsilon$ (step S114). The guidance control unit 160 calculates the guidance parameter Plead(k) on the basis of $M\theta(k-j)$ (step S116) and provides guidance for the driver of the host vehicle M or the steering state of the host vehicle M in accordance with the guidance parameter Plead(k) (step S118).

According to the first embodiment described above, it is possible to appropriately improve responsiveness in necessary situations.

Second Embodiment

A second embodiment will be described below. In the first embodiment, the steering state is the steering angle $\theta M$ and the avoidance trajectory error $E\theta(k)$ is set as the difference between the steering angle $\theta M$ of the host vehicle M and the target steering angle $\theta M^*$ for the host vehicle M to move along the avoidance trajectory $K^*$. In the second embodiment, the steering state is represented by two or more lateral positions through which the host vehicle M is expected to pass corresponding to two or more longitudinal positions related to a longitudinal direction of a road (an example of a movement path), wherein the two or more lateral positions are on a trajectory K predicted by the trajectory prediction unit 130. The lateral position is, for example, a position in the width direction of the road, and is defined on the basis of a center point or either the left or right end point of a lane. The avoidance trajectory error $E\theta(k)$ in the second embodiment is a value indicating a degree of deviation related to the lateral positions of the trajectory K and the avoidance trajectory $K^*$. More specifically, the avoidance trajectory error $E\theta(k)$ is a sum of amounts of deviation when positions associated with the same longitudinal position among the two or more lateral positions on the trajectory K and the two or more lateral position on the avoidance trajectory $K^*$ are compared. The following description will focus on the associated differences.

Figure 6:
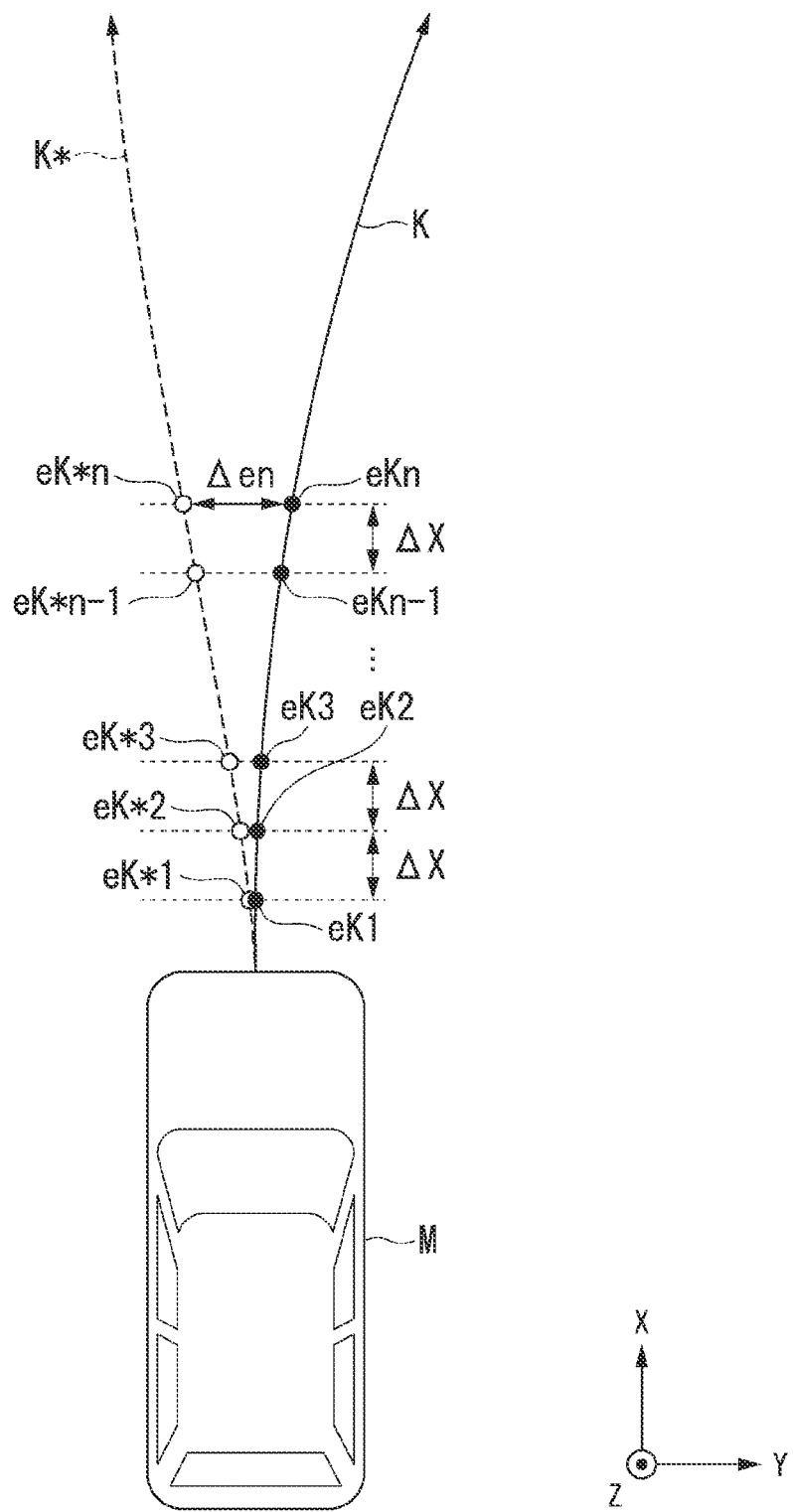
FIG. 6 is a diagram for describing an avoidance trajectory error in a second embodiment.

FIG. 6 is a diagram for describing the avoidance trajectory error $E\theta(k)$ in the second embodiment. The guidance control unit 160 assumes a plurality of virtual points $eKq$ (q=1 to n) on the trajectory K at equal intervals (every $\Delta X$) with respect to a longitudinal direction X of the road and assumes a plurality of virtual points $eK^*q$ (q=1 to n) on the trajectory $K^*$ at equal intervals (every $\Delta X$) with respect to the longitudinal direction X of the road. Distances from a distance $\Delta e1$ between a virtual point $eK1$ and the virtual point $eK^*1$ to a distance $\Delta en$ between a virtual point $eKn$ and a virtual point $eK^*n$ are obtained and divided by n+1 to calculate the avoidance trajectory error $E\theta(k)$. A method of calculating the avoidance trajectory error $E\theta(k)$ in the second embodiment is represented by Eq. (4). Like the avoidance trajectory error $E\theta(k)$ in the first embodiment, the avoidance trajectory error $E\theta(k)$ in the second embodiment is deviation between the avoidance trajectory $K^*$ that is preferably generated and the trajectory K in the case of traveling in the current situation, effects similar to those of the first embodiment can be expected.

$$E\theta(k) = \frac{1}{n+1} \cdot \sum_{q=1}^{n} \Delta en \quad (4)$$

According to the above-described second embodiment, as in the first embodiment, it is possible to appropriately improve responsiveness in necessary situations.

Third Embodiment

A third embodiment will be described below. In the third embodiment, a method of calculating an avoidance trajectory error Eθ(k) may be either the first embodiment or the second embodiment. A driving assistance device of the third embodiment calculates a guidance parameter using a method different from that of the first or second embodiment. This will be described below. Hereinafter, values different in nature from those in the first or second embodiment are appended with "#," such as Dθ #(k) denotes an amount of change and Plead #(k) denotes the guidance parameter in the third embodiment.

The guidance control unit 160 according to the third embodiment calculates the amount of change (an intermediate variable) Dθ #(k) on the basis of an avoidance trajectory error Eθ(k) at a reference point (k) in time and a past value of the guidance parameter Plead # (for example, the guidance parameter Plead #(k−1) that is a previous value). Also, the guidance control unit 160 according to the third embodiment calculates the guidance parameter Plead #(k) on the basis of a past value of the guidance parameter Plead # (for example, the guidance parameter Plead #(k−1) that is the previous value) and the amount of change in the avoidance trajectory error Eθ(k) at the reference point (k) in time. At this time, when an amount of change Dθ#(k) of the avoidance trajectory error exceeds a first threshold value εp or is less than a second threshold value εn that is a negative value, the guidance control unit 160 calculates the guidance parameter Plead #(k) by increasing the weight of the avoidance trajectory error Eθ(k) at the reference point (k) in time for the past value of the guidance parameter Plead #.

The guidance control unit 160 calculates the guidance parameter Plead #(k) on the basis of, for example, Eqs. (5) to (7). In Eqs. (5) to (7), Kf(k) is a variable gain multiplied by the avoidance trajectory error Eθ(k) and Kf−ε is a set value between 0 and 1 (a filtering gain when the amount of change is small).

$$D\theta\#(k) = E\theta(k) - \text{Plead}\#(k-1) \quad (5)$$

$$Kf(k) = \begin{cases} 1 & (D\theta\#(k) > \varepsilon p) \\ Kf - \varepsilon & (-\varepsilon n \leq D\theta\#(k) \leq \varepsilon p) \\ 1 & (D\theta\#(k) < \varepsilon n) \end{cases} \quad (6)$$

$$\text{Plead}\#(k) = \text{Plead}\#(k-1) + Kf(k) \cdot D\theta\#(k) \quad (7)$$

By calculating the guidance parameter Plead #(k) in this way, it is possible to quickly provide guidance corresponding to a change in a surrounding situation because the guidance parameter Plead #(k) quickly follows the avoidance trajectory error Eθ(k) when the surrounding situation of the host vehicle M has suddenly changed as in the first embodiment or the second embodiment.

Figure 7:
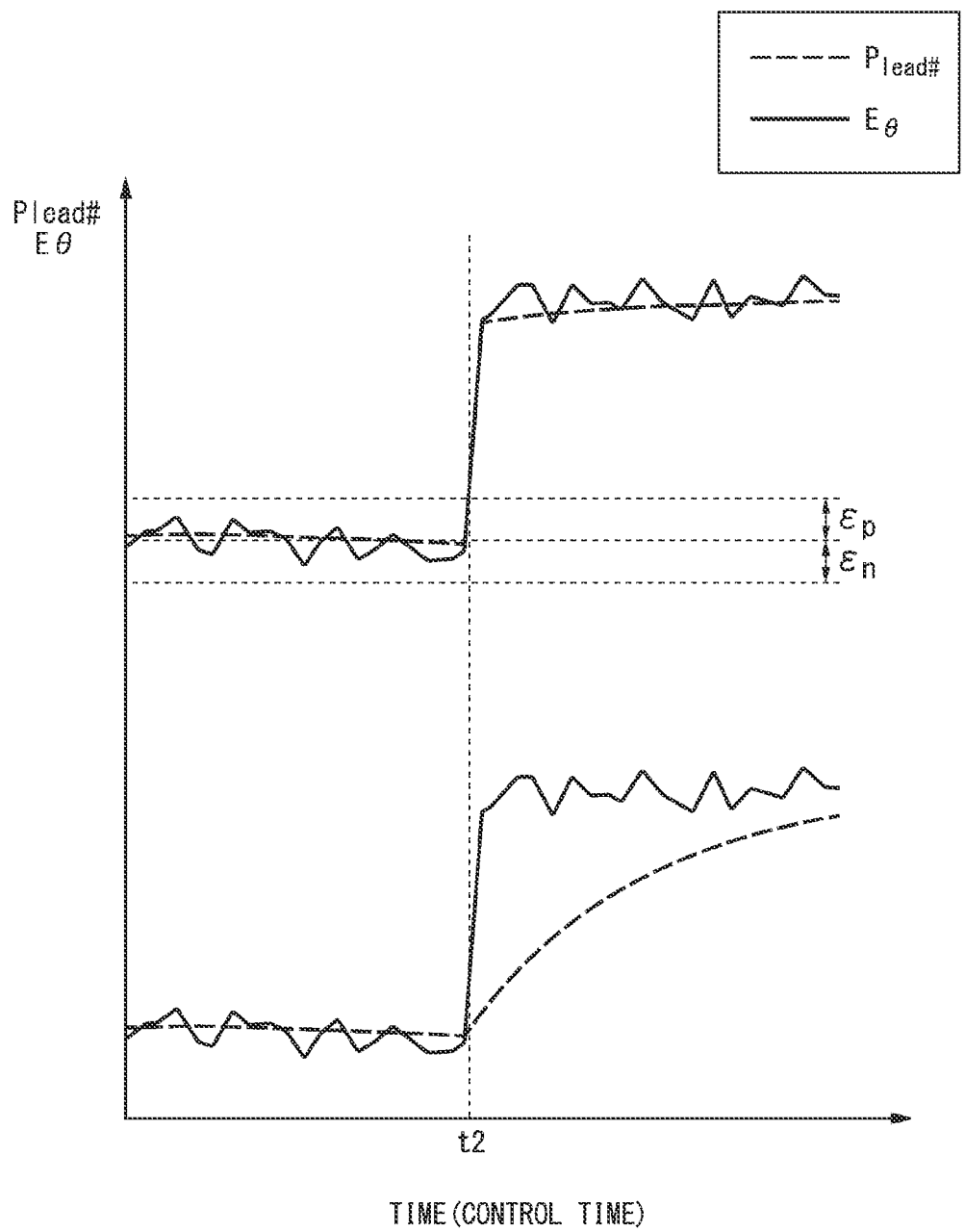
FIG. 7 is a graph showing an example of a change over time in an avoidance trajectory error and a guidance parameter according to a third embodiment.

FIG. 7 is a graph showing an example of changes over time in the avoidance trajectory error Eθ and the guidance parameter Plead #. The upper diagram of FIG. 7 shows a change over time in the guidance parameter Plead # calculated in the method of the third embodiment and the lower diagram of FIG. 7 shows a change over time in the guidance parameter Plead # when Kf(k) has been fixed by Kf−ε. As shown in FIG. 7, immediately after time t2 when the avoidance trajectory error Eθ suddenly changes, the guidance parameter Plead # in the upper diagram quickly follows the avoidance trajectory error Eθ, whereas the guidance parameter Plead # in the lower diagram slowly follows the avoidance trajectory error Eθ due to the action of a primary delay.

According to the above-described third embodiment, as in the first embodiment or the second embodiment, it is possible to appropriately improve responsiveness in necessary situations.

<Case of Application to Automated Driving>

In each of the above-described embodiments, driving assistance exclusively based on manual driving has been described. The present invention can be similarly applied to automated driving in which the driver basically does not perform driving operations. In this case, the "steering state" is a steering angle for traveling along a target trajectory generated by a main route generation unit for automated driving or lateral positions of a plurality of virtual points on a target trajectory. For these, it is only necessary to calculate the avoidance trajectory error Eθ(k) in the method described in the first embodiment or the second embodiment and perform a subsequent process. The guidance control unit 160 determines an amount of correction steering on the basis of, for example, the guidance parameter Plead(k), and corrects the steering state of the host vehicle M on the basis of an amount of correction steering.

Although modes for carrying out the present invention have been described above using embodiments, the present invention is not limited to the embodiments and various modifications and substitutions can also be made without departing from the scope and spirit of the present invention.

What is claimed is:

1. A driving assistance device comprising:
   a storage device configured to store a program; and
   a processor connected to the storage device,
   wherein the processor executes the program stored in the storage device to:
   recognize a physical object located at least at one side of a moving object in a traveling direction, the moving object having to avoid contact with the physical object,
   generate a future avoidance trajectory along which the moving object is moveable while avoiding the contact with the physical object,
   acquire a steering state of the moving object,
   calculate a first avoidance trajectory error indicating an amount of deviation between the steering state and the avoidance trajectory at a reference point in time,
   calculate a second avoidance trajectory error indicating an amount of deviation between the steering state and the avoidance trajectory at a past point in time, the past point in time being earlier than the reference point in time,
   obtain a first threshold value being a positive value,
   obtain a second threshold value being a negative value,
   calculate an amount of error change between the first avoidance trajectory error and the second avoidance trajectory error,
   determine whether or not the amount of the error change exceeds the first threshold value or is less than the second threshold value, calculate an index value by making a weight of the second avoidance trajectory error greater than a weight of the first avoidance trajectory error when the amount of the error change does not exceed the first threshold value or is greater than or equal to the second threshold value,
calculate the index value by making the weight of the first avoidance trajectory error greater than the weight of the second avoidance trajectory error when the amount of the error change exceeds the first threshold value or is less than the second threshold value, and
guide a driver of the moving object or the moving object such that the steering state of the moving object is changed in accordance with the index value.

2. The driving assistance device according to claim 1, wherein the processor calculates a plurality of second avoidance trajectory errors, each of the plurality of second avoidance trajectory errors indicating an amount of deviation between the steering state and the avoidance trajectory at a past point in time, the past point being earlier than the reference point in time,
the processor calculates the plurality of second avoidance trajectory errors based on a plurality of periods from a plurality of previous points in time to the reference point in time, and
the processor determines whether or not the amount of the error change exceeds the first threshold value or is less than the second threshold value with respect to each of the plurality of periods, and
wherein the processor calculates the index value by obtaining statistical values of the plurality of second avoidance trajectory errors at the plurality of points in time, and wherein
at the time of the calculation of the index value, the processor calculates the index value by replacing the second avoidance trajectory error at a corresponding point in time with the first avoidance trajectory error, with respect to points in time corresponding to a period in which the amount of the error change exceeds the first threshold value or is less than the second threshold value.

3. The driving assistance device according to claim 1, wherein the processor calculates the amount of the error change on the basis of the first avoidance trajectory error and a past value of the index value,
the processor calculates the index value on the basis of the past value of the index value and the amount of the error change, and wherein
at the time of the calculation of the index value, the processor calculates the index value by increasing the weight of the first avoidance trajectory error for the past value of the index value when the amount of the error change exceeds the first threshold value or is less than the second threshold value.

4. The driving assistance device according to claim 1, wherein each of the first avoidance trajectory error and the second avoidance trajectory error is a difference between a steering angle of the moving object and a target steering angle for the moving object to move along the avoidance trajectory.

5. The driving assistance device according to claim 1, wherein each of the first avoidance trajectory error and the second avoidance trajectory error is a value indicating a degree of deviation in a lateral direction between a trajectory through which the moving object is predicted to pass and the avoidance trajectory on an assumption that the steering state of the moving object continues.

6. The driving assistance device according to claim 5, wherein, on the assumption that the steering state of the moving object continues, the value indicating the degree of deviation is a sum of amounts of deviation associated with differences between first positions and second positions,
the first positions are two or more lateral positions through which the moving object is predicted to pass and which correspond to two or more longitudinal positions related to the movement path in a longitudinal direction, and
the second positions are two or more lateral positions on the avoidance trajectory corresponding to the two or more longitudinal positions.

7. The driving assistance device according to claim 1, wherein the processor guides the driver of the moving object such that the steering state of the moving object is changed by causing a speaker to output a sound for prompting the driver to change the steering state and/or causing a display device to display an image for prompting the driver to change the steering state.

8. The driving assistance device according to claim 1, wherein the processor causes a reaction force for preventing an operation in the same direction as that of a current steering state to be output to an actuator attached to a steering operation element that receives a steering operation of the driver, and thereby the processor guides the driver of the moving object or the moving object such that the steering state of the moving object is changed.

9. The driving assistance device according to claim 1, wherein the processor guides the driver of the moving object or the moving object such that the steering state of the moving object is changed by increasing a steering force in a direction opposite to that of a current steering state with respect to a steering device.

10. A driving assistance method using a driving assistance device, the method comprising:
acquiring a steering state of a moving object;
recognizing a physical object located at least at one side of the moving object in a traveling direction, the moving object having to avoid contact with the moving object;
calculating a first avoidance trajectory error indicating an amount of deviation between the steering state and the avoidance trajectory at a reference point in time;
calculating a second avoidance trajectory error indicating an amount of deviation between the steering state and the avoidance trajectory in a past point in time, the past point in time being earlier than the reference point in time;
obtaining a first threshold value being a positive value;
obtaining a second threshold value being a negative value;
calculating an amount of error change between the first avoidance trajectory error and the second avoidance trajectory error;
determining whether or not the amount of the error change exceeds the first threshold value or is less than the second threshold value;
calculating an index value by making a weight of the second avoidance trajectory error greater than a weight of the first avoidance trajectory error when the amount of the error change does not exceed the first threshold value or is greater than or equal to the second threshold value;
calculating the index value by making the weight of the first avoidance trajectory error greater than the weight of the second avoidance trajectory error when the amount of the error change exceeds the first threshold value or is less than the second threshold value; and guiding a driver of the moving object or the moving object such that the steering state of the moving object is changed in accordance with the index value.

11. A computer-readable non-transitory storage medium storing a program causing a processor of a driving assistance device to:

acquire a steering state of a moving object, recognize a physical object located at least at one side of the moving object in a traveling direction, the moving object having to avoid contact with the physical object, calculate a first avoidance trajectory error indicating an amount of deviation between the steering state and the avoidance trajectory at a reference point in time, calculate a second avoidance trajectory error indicating an amount of deviation between the steering state and the avoidance trajectory in a past point in time, the past point in time being earlier than the reference point in time, obtain a first threshold value being a positive value, obtain a second threshold value being a negative value, calculate an amount of error change between the first avoidance trajectory error and the second avoidance trajectory error, determine whether or not the amount of the error change exceeds the first threshold value or is less than the second threshold value, calculate an index value by making a weight of the second avoidance trajectory error greater than a weight of the first avoidance trajectory error when the amount of the error change does not exceed the first threshold value or is greater than or equal to the second threshold value, calculate the index value by making the weight of the first avoidance trajectory error greater than the weight of the second avoidance trajectory error when the amount of the error change exceeds the first threshold value or is less than the second threshold value, and guide a driver of the moving object or the moving object such that the steering state of the moving object is changed in accordance with the index value.

* * * * *